US012768698B2

(12) United States Patent
Triunfo et al.

(10) Patent No.: US 12,768,698 B2
(45) Date of Patent: Oct. 20, 2026

(54) ULTRASENSITIVE LIQUID LEVEL SENSOR

(71) Applicant: Sonics & Materials, Inc., Newtown, CT (US)

(72) Inventors: John Anthony Triunfo, Fairfield, CT (US); Michael Svend Stefansen, Danbury, CT (US)

(73) Assignee: Sonic & Materials, Inc., Newton, CT (US)

( * ) Notice: Subject to any disclaimer, the term of this patent is extended or adjusted under 35 U.S.C. 154(b) by 247 days.

(21) Appl. No.: 18/811,251

(22) Filed: Aug. 21, 2024

(65) Prior Publication Data

US 2026/0056047 A1 Feb. 26, 2026

(51) Int. Cl.
*G01F 23/24* (2006.01)

(52) U.S. Cl.
CPC .......... *G01F 23/241* (2013.01); *G01F 23/242* (2013.01); *G01F 23/243* (2013.01)

(58) Field of Classification Search
CPC .... G01F 23/243; G01F 23/242; G01F 23/241; G01F 23/244
See application file for complete search history.

(56) References Cited

U.S. PATENT DOCUMENTS 4,879,902 A 11/1989 Loniello
4,947,689 A 8/1990 Hochstein
5,802,728 A 9/1998 Karnick et al.
5,950,487 A 9/1999 Maresca, Jr. et al.
6,820,483 B1 11/2004 Beckerman
7,878,058 B2 2/2011 Blendinger et al.
9,488,513 B2 11/2016 Kumar et al.
9,649,846 B2 5/2017 Kimura et al.
11,209,301 B2 12/2021 Arreaza et al.
11,499,859 B2 11/2022 Zorzetto et al.
11,555,733 B2 1/2023 Beckett
(Continued)

FOREIGN PATENT DOCUMENTS

CN 206876259 U 1/2018
CN 112041643 A 12/2020
(Continued)

OTHER PUBLICATIONS

Carolyn Mathas, Material Selection for Liquid-Level Sensors, Jan. 17, 2013 https://w w w .digikey.com/en/articles/material-selection-for-liquid-level-sensors.
(Continued)

*Primary Examiner* — Paul M. West
(74) *Attorney, Agent, or Firm* — Forge IP, PLLC

(57) ABSTRACT

An electronic liquid level sensor configured to verify a height of a liquid in a reservoir between minimum and maximum levels includes at least one reference electrode, a minimum level electrode and a maximum level electrode. Each of the minimum level electrode and the maximum level electrode is configured as a pin having at least one tapered portion with a diameter between 0.010" and 0.035" at a widest point of the tapered portion, an angle of taper of the at least one tapered portion with respect to a longitudinal axis of the pin being between 181° and 193°, a total length of the at least one tapered portion being between 0.110" and 0.150", and a radius of curvature of a tip of the pin being less than 0.015".

24 Claims, 6 Drawing Sheets

(56) References Cited

U.S. PATENT DOCUMENTS

| | | | |
|---|---|---|---|
| 11,680,839 | B2 | 6/2023 | Yednak, III |
| 2005/0247330 | A1 | 11/2005 | Land et al. |
| 2007/0186593 | A1 * | 8/2007 | Ahn .................... D06F 39/40 68/5 R |
| 2021/0356311 | A1 * | 11/2021 | Arnold ................ G01F 23/0007 |
| 2022/0219460 | A1 | 7/2022 | Clayburn et al. |
| 2022/0322860 | A1 | 10/2022 | Taylor |
| 2023/0314200 | A1 | 10/2023 | Lindow |
| 2024/0027254 | A1 | 1/2024 | Benatti et al. |

FOREIGN PATENT DOCUMENTS

| | | |
|---|---|---|
| JP | 2001264146 A | 9/2001 |
| WO | 2021150211 | 7/2021 |
| WO | 2023139353 | 7/2023 |

OTHER PUBLICATIONS

Machine Translation of CN206876259U.

* cited by examiner

ULTRASENSITIVE LIQUID LEVEL SENSOR

FIELD OF THE INVENTION

The present invention relates generally to liquid level sensors, and more particularly to conductive liquid level sensors of the type that rely on the electrical resistance between a sensing electrode and a reference electrode (which may take the form of multiple conductive pins, studs or the like) in order to determine the level of a liquid.

BACKGROUND OF THE INVENTION

Conductive liquid level sensors employing one or more sensing electrodes and a reference electrode are known, with a basic schematic representation of this type of device being shown in FIG. 1.

In the illustrated example, three electrodes are provided within a vessel (10) containing a liquid. A common ground electrode (12) extends down to the greatest extent to ensure that it will always be in contact with a liquid when the other electrodes contact the liquid. A minimum level electrode (14) extends down to a degree such that contact is made with the liquid at a minimum desired liquid level (shown by a dashed line). At that point, a circuit is closed between the minimum level electrode (14) and the common ground electrode (12) through the liquid, such that a determination can be made that the liquid is at or above the minimum desired level.

A maximum level electrode (16) extends down to a degree such that contact is made with the liquid at a maximum desired liquid level (shown by a dotted line). At that point, a circuit is closed between the maximum level electrode (16) and the common ground electrode (12) through the liquid, such that a determination can be made that the liquid is at or above the maximum desired level.

A controller (18) can be used to make the aforementioned determinations when the minimum and/or maximum desired liquid levels have been reached, with displays (such as LEDs) providing a visual indication thereof. The controller may also be modified so as to provide a sinking output option or the like to carry the output signals to a connector for external monitoring via a programmable logic controller (PLC) or the like. Various provisions can further be made for the controller (18) to automatically adjust the liquid level to ensure that it remains between the minimum and maximum desired levels by employing pumps, valves, etc. (not shown).

In certain situations, the required liquid level tolerances can be extreme. For example, in the case of a liquid bath for the ultrasonic preparation of liquid samples, the difference between the minimum and maximum desired liquid levels can be, e.g., 0.010" or even less.

A problem associated with trying to maintain such tight tolerances in this context (unlike other liquid level sensing situations, where extremely tight tolerances are not critical) relates to the fact that liquids exhibit surface tension. Thus, as the liquid level is falling, surface tension may cause the liquid to "stick" to the electrodes, preventing the sensing circuit from opening until the liquid level is actually lower than desired. This phenomenon is illustrated in FIGS. 2A and 2B.

The present invention aims to remedy these issues by providing the minimum level electrode and the maximum level electrode with very particular configurations and employing very particular methods to reduce the potential effects of the liquid's surface tension on measurement accuracy.

SUMMARY OF THE INVENTION

In accordance with one aspect of the present invention, an electronic liquid level sensor configured to verify a height of a liquid in a reservoir between minimum and maximum levels includes a housing having a bottom wall, at least one reference electrode extending downward from the bottom wall of the housing to a reference level height, a minimum level electrode extending downward from the bottom wall of the housing to a minimum level height and a maximum level electrode extending downward from the bottom wall of the housing to a maximum level height. The minimum level height is vertically lower than the maximum level height, and the reference level height is vertically lower than both the minimum level height and the maximum level height. The sensor also includes a first indicator responsive to a circuit being closed between the minimum level electrode and the at least one reference electrode such that when the liquid level reaches the minimum level height the first indicator is activated and a second indicator responsive to a circuit being closed between the maximum level electrode and the at least one reference electrode such that when the liquid level reaches the maximum level height the second indicator is activated. Each of the minimum level electrode and the maximum level electrode is configured as a pin having at least one tapered portion with a diameter between 0.010" and 0.035" at a widest point of the tapered portion, an angle of taper of the at least one tapered portion with respect to a longitudinal axis of the pin being between 181° and 193°, a total length of the at least one tapered portion being between 0.110" and 0.150", and a radius of curvature of a tip of the pin being less than 0.015".

In some embodiments, the diameter of the at least one tapered portion at the widest point thereof is between 0.015" and 0.030". In certain of these embodiments, the diameter of the at least one tapered portion at the widest point thereof is between 0.020" and 0.025".

In some embodiments, the angle of taper of the at least one tapered portion with respect to the longitudinal axis of the pin is between 182° and 188°. In certain of these embodiments, the angle of taper of the at least one tapered portion with respect to the longitudinal axis of the pin is between 183° and 187°. In certain embodiments, the angle of taper of the at least one tapered portion with respect to the longitudinal axis of the pin is between 184° and 186°.

In some embodiments, the total length of the at least one tapered portion is between 0.120" and 0.140". In certain of these embodiments, the total length of the at least one tapered portion is between 0.125" and 0.135".

In some embodiments, the radius of curvature of the tip of the pin is less than 0.010". In certain of these embodiments, the radius of curvature of the tip of the pin is no more than 0.005".

In some embodiments, the at least one tapered portion comprises a single taper portion having a single taper angle. In some embodiments, the at least one tapered portion comprises multiple tapered portions, each having a different taper angle.

In some embodiments, the liquid is deionized water. In certain of these embodiments, each of the minimum level electrode and the maximum level electrode is configured so as to cause the deionized water to exhibits a surface tension effect of 0.008" or less, whereby a known liquid level tolerance range of one thousandth of an inch or less is achieved.

In some embodiments, the at least one reference electrode comprises a single common reference electrode. In some embodiments, each of the pins comprises a steel substrate with a polished nickel plating.

In some embodiments, each of the minimum level electrode and the maximum level electrode is configured so as to allow for the minimum level height and the maximum level height to be adjustable. In certain of these embodiments, the adjustability of the minimum level height and the maximum level height is accomplished by provision of the minimum level electrode and the maximum level electrode with threaded portions.

In some embodiments, at least one foot extends from the bottom wall of the housing to at least the same extent as does the at least one reference electrode.

In some embodiments, the first indicator and the second indicator comprise visual indicators. In certain of these embodiments, the first indicator and the second indicator comprise lights. In certain embodiments, the first indicator comprises a green light and the second indicator comprises a red light. As noted above, the minimum and maximum level signals can also be used in a closed loop system to drive a water level controller system. Also as noted above, the minimum and maximum signals can be output to a connector for external monitoring via a programmable logic controller (PLC) or the like.

In accordance with another aspect of the present invention, a system for ultrasonic sample preparation comprises a liquid reservoir defined in part by an ultrasonic horn having a top surface, along with an electronic liquid level sensor as described above disposed on the top surface of the ultrasonic horn.

The present invention, therefore, provides a conductive liquid level sensor of the type that relies on the electrical resistance between one or more sensing electrodes and a common ground/reference electrode in order to determine the level of a liquid, in which the electrodes are particularly configured and particular methods are employed to reduce the potential effects of the surface tension of the liquid being measured on measurement accuracy.

Other features and advantages of the invention will become more apparent from consideration of the following drawings.

DETAILED DESCRIPTION OF THE INVENTION

Figure 1:
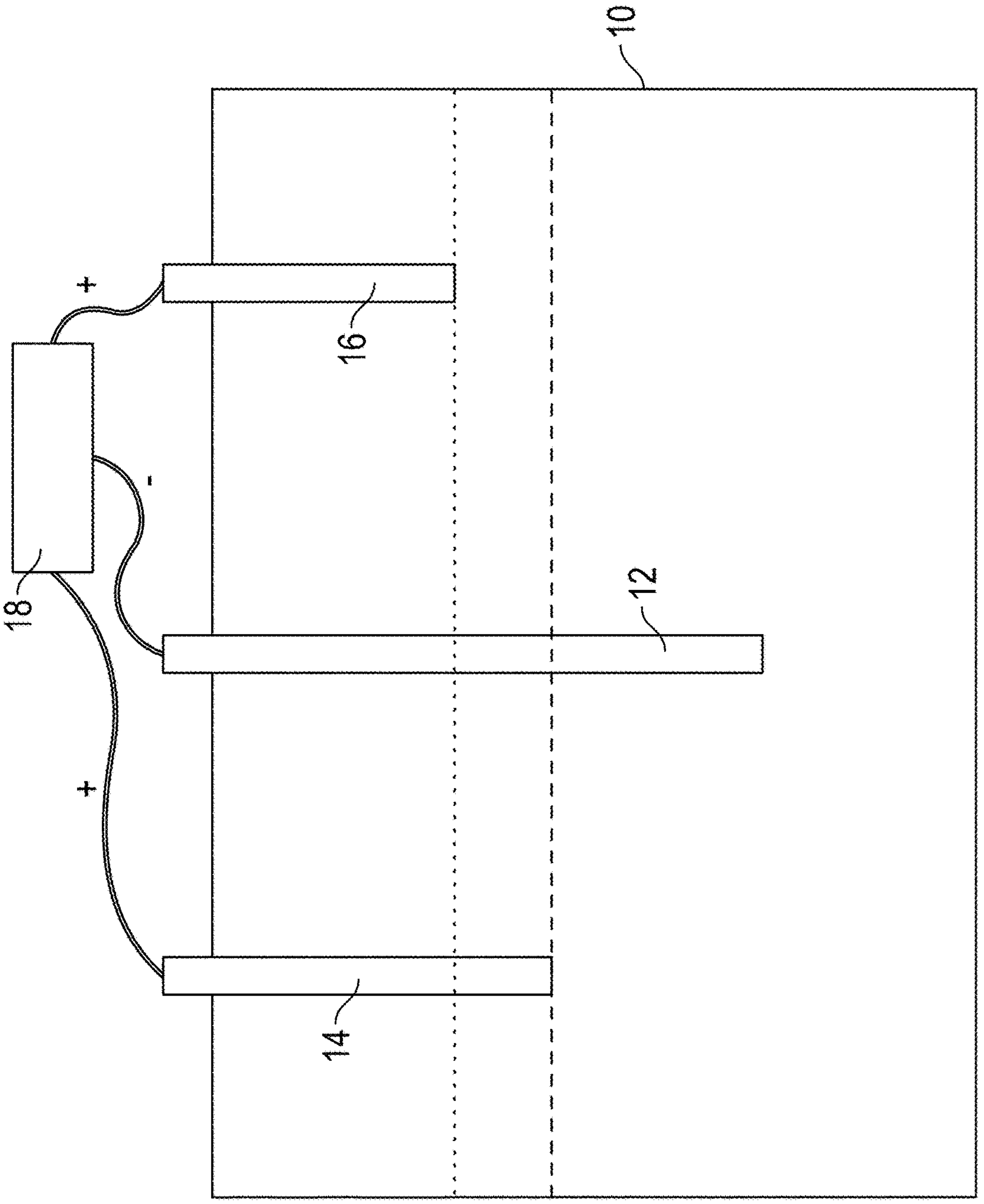
FIG. 1 (Prior Art)
FIG. 1 is a basic schematic representation of a known conductive liquid level sensor of the type that relies on the electrical resistance between one or more sensing electrodes and a common ground/reference electrode in order to determine the level of a liquid.
Figure 2A:
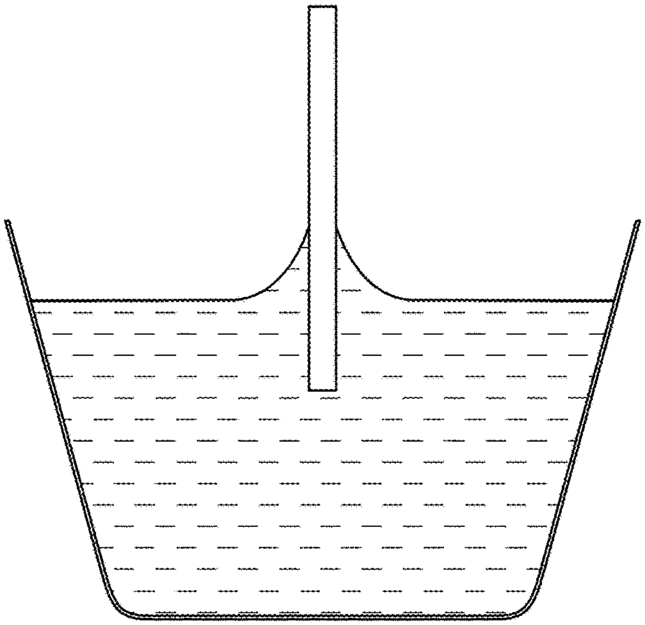
FIGS. 2A and 2B are schematic representations illustrating the potential effects of liquid surface tension on measurement accuracy.
Figure 2B:
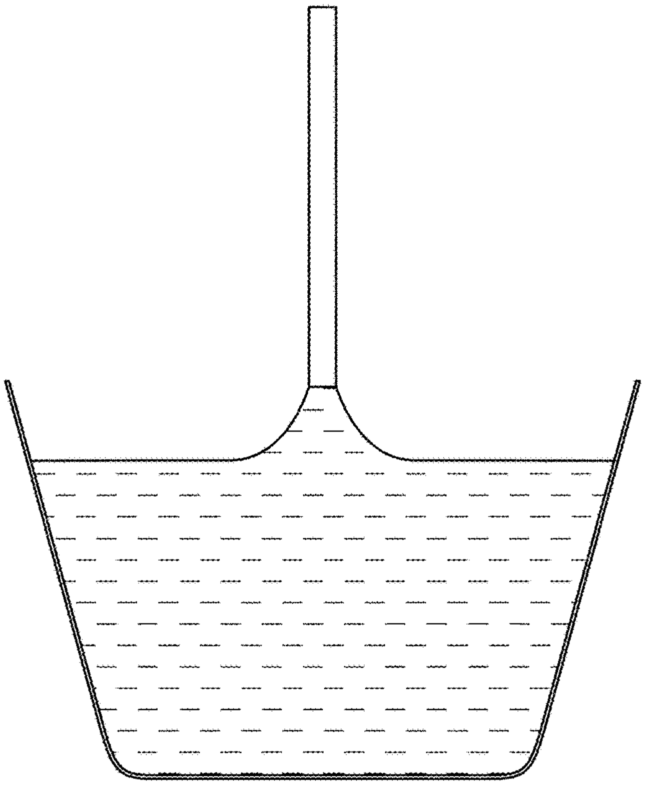
Figure 3:
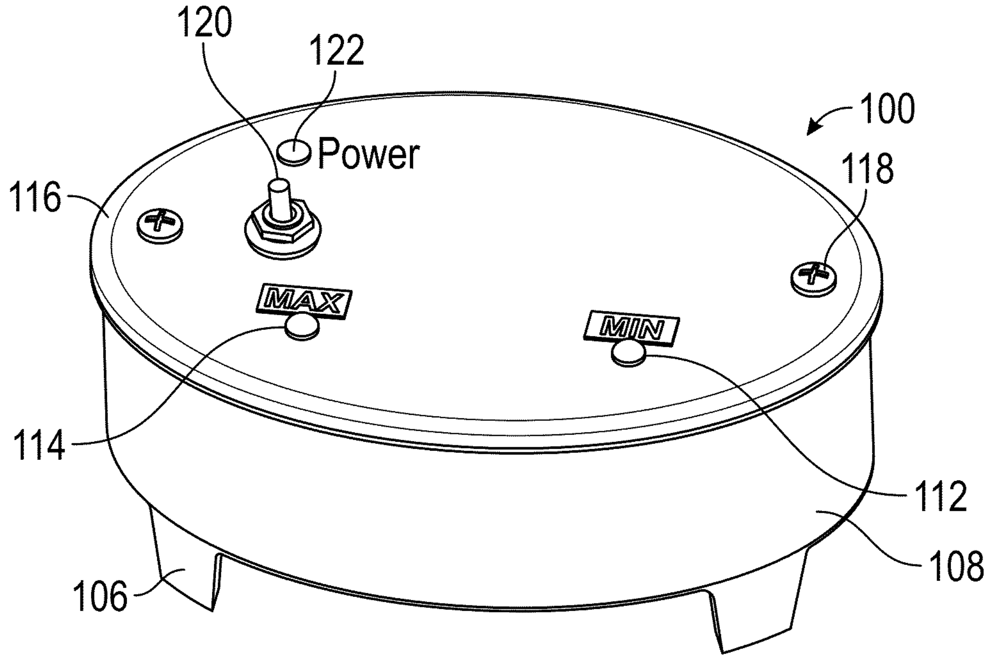
FIG. 3 is a side isometric view of an exemplary embodiment of a liquid level sensor in accordance with the present invention.
Figure 4:
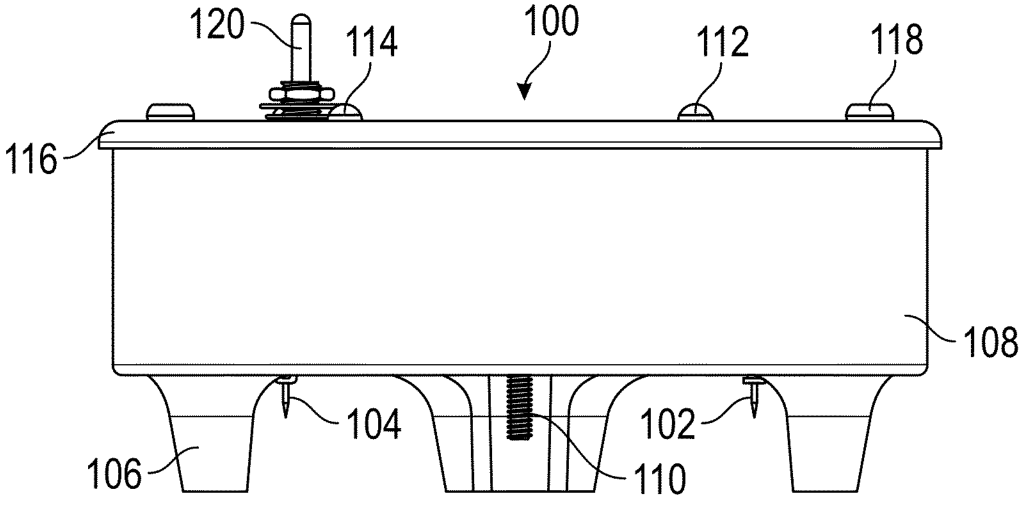
FIG. 4 is a side elevational view of the inventive liquid level sensor shown in FIG. 3.

FIGS. 3 and 4 generally illustrate an electronic liquid level sensor (100) that is used to verify liquid height in a reservoir between minimum and maximum levels. A circuit is designed to detect when the liquid level is within an acceptable pre-set range. A minimum level electrode (102) and a maximum level electrode (104) are adjustable to these defined heights. In the illustrated embodiment, these heights are set relative to the bottom of feet (106) provided on the sensor housing (108). In the illustrated embodiment, three feet (106) are shown, although a greater or lesser number of feet may be provided. A common ground electrode (110) is employed for both the minimum and maximum circuits.

The ideal liquid level is between the minimum and maximum levels. To achieve this, the level can be set using various methods. For example, in one method, the liquid can be introduced into the reservoir with the sensor (100) in place. When the liquid level reaches the height of the minimum electrode (102), it completes the electrical circuit to activate a first visual indicator (112) (e.g., illuminate a green light). When the liquid level reaches the height of the maximum electrode (104), it completes the electrical circuit to activate a second visual indicator (114) (e.g., illuminate a red light).

In another exemplary method, an approximate volume of liquid slightly above the maximum level may be provided in the reservoir before the sensor (100) is set in place. The liquid level is above the maximum level and therefore, both the first visual indicator (112) (e.g., the green light) and the second visual indicator (114) (e.g., the red light) are activated. As the liquid level is lowered just below the height of the maximum electrode (104), it breaks the electrical circuit and the second visual indicator (114) (e.g., the red light) turns off. If the liquid level is further lowered below the height of the minimum electrode (102), it breaks the electrical circuit and the second visual indicator (112) (e.g., the green light) turns off.

A printed circuit board (PCB) or the like (not shown) for controlling these operations may be disposed within the sensor housing (108). Preferably, the sensor housing includes a removeable cover (116) affixed with screws (118) or the like in order to provide access to the printed circuit board disposed within the housing (108).

The sensor is preferably powered by a battery disposed within the housing (108), though a power cord may be provided to connect to mains power (either directly or via a power transformer). A power switch (120) is provided to turn on/off power to the printed circuit board in order to conserve battery life. A third visual indicator (122) (e.g., a blue light) may be provided so as to be illuminated when the power switch is turned on and be extinguished when the power switch is turned off.

The liquid level sensor (100) of the present invention may be used in many different applications and in connection with many different liquids. One example of an application in connection with which the sensor (100) has been found to be particularly useful is when setting the level of water in a reservoir employed by a system for ultrasonic sample preparation.

As is known ultrasound is frequently used for sample preparation, including the processing, disrupting, and/or homogenizing of biological, chemical, and industrial substances. Microplates are frequently used in molecular biology applications, particularly in sample processing (i.e., genomic DNA, chromatin, cells, tissues, etc.) for a range of high-throughput analytical techniques, including next-generation sequencing, chromatin immunoprecipitation, quantitative polymerase chain reaction, and the like. Focused ultrasound may be used for sample processing. However, traditional technologies typically can only process one sample at a time, which prolongs processing time and significantly drives up the labor costs. Additionally, since processing occurs serially, a robotic system is used to raster scan the microplate across the single-focus transducer. This also drives up the instrument cost.

When there are multiple samples to process, sonication can be performed serially (one at a time), or the sonication system can be optimized in various ways to sonicate multiple samples simultaneously. When sonicating multiple samples simultaneously, it is desirable to achieve a certain level of uniformity that equates to consistent processing depending on the application. The level of uniformity should match that of serial (one at a time) sonication. There are many types of sonication methods and devices available, many of which can accommodate simultaneous sonication of multiple samples.

One consideration when sonicating multiple samples simultaneously is the uniformity of the acoustic field of the sonicator. Without a uniform field, techniques such as linear translation or circular rotation are required to ensure each sample receives the same amount of acoustic energy. Another design consideration is the acoustic scattering effect of the sample vessels themselves and how those interactions affect the uniformity of the acoustic field at the target axial depth (position of the sample). For example, consider that a perfectly uniform acoustic field is designed for sonicating a 96-well PCR plate, such that consistent acoustic energy can be measured at the location of each of the wells of the 96-well plate. The reflections, refractions, scattering, and absorption of the ultrasound energy by each of the PCR plate wells (including the contents of each well) may interfere with the incident acoustic wave in a way where all wells do not receive the same magnitude ultrasound energy over a period of active sonication time. Various techniques are known for attempting to address these issues, with great care being taken to ensure that each of the PCR plate wells received substantially the same amount of acoustic energy.

One ubiquitous technique for helping to ensure a uniform ultrasonic field is to partially or fully submerge the sample vessel(s) in a liquid reservoir, such as a water bath. The water is typically deionized water, though such is not strictly required. What is typically required, however, in order to achieve the desired level of uniformity and repeatability, is for the liquid level to be maintained within a very tight tolerance range (e.g., within one thousandth of an inch or even less). The liquid level sensor (100) of the present invention greatly facilitates the satisfaction of this requirement.

As discussed above, the function of the electrodes in the electronic liquid sensor application is to set the liquid height at a minimum and maximum level. They must also provide electrical connection when in contact with liquid. As discussed in more detail below, adjustable height pins are used as the minimum and maximum electrodes (102, 104) to connect the liquid to the device printed circuit board (not shown). In theory, any shape or type of conductive pin will create an electrical circuit between the liquid and the printed circuit board. However, we have discovered that the configuration of the conductive pins have a significant impact on sensor accuracy, particularly when extremely tight tolerances are required.

Figure 5:
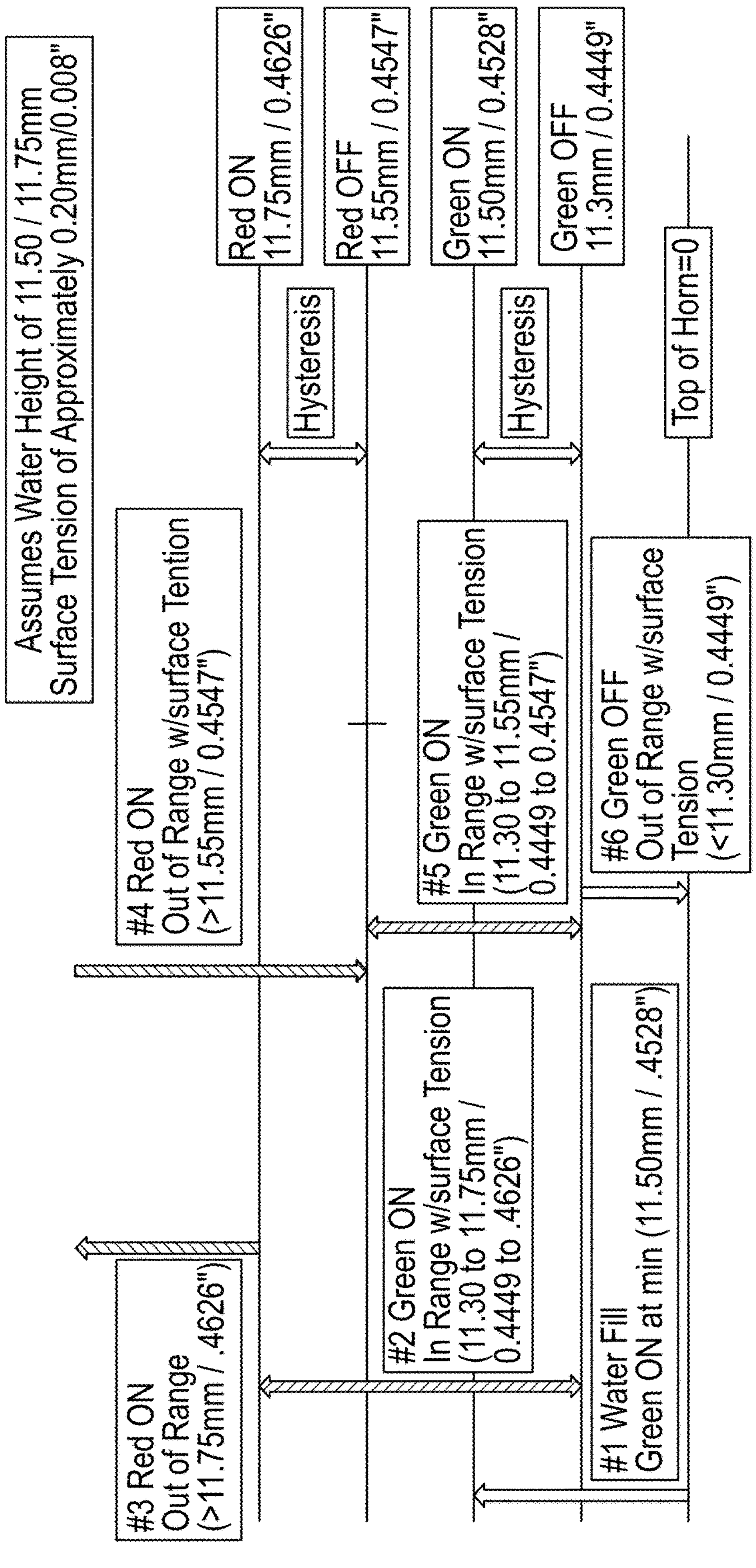
FIG. 5 is a schematic diagram illustrating operation of the inventive liquid level sensor shown in FIGS. 3 and 4.

With reference now to FIG. 5, operation of the exemplary liquid level sensor (100) shown in FIGS. 3 and 4 is discussed. In this example, the sensor (100) is suitable for use in connection with setting the level of deionized water in a reservoir of an ultrasonic sample preparation system. In this example, the feet (106) of the sensor (100) would be rested on the top surface of an ultrasonic horn (which itself defines part of the reservoir) and then the water level is set with respect to the top surface of an ultrasonic horn. In the illustrated example, the sensor is adapted to detect minimum and maximum water levels within 0.010 inches (0.25 mm) of each other.

In an ideal situation, the sensor (100) would be able to detect the water at the minimum and maximum levels without variation. However, due to the surface tension of the water on the pins, water height variation is introduced into the system. To minimize the variation, the pins are configured in a particular way, as described in more detail below.

With respect to FIG. 5, operation of a typical application of the sensor (100) in a water reservoir is shown below. The target water height in this example application is 11.50 mm (0.4528"). Employing the inventive pin configuration discussed below, the deionized water exhibits a surface tension of 0.20 mm (0.008") or less. Accordingly, the height of the minimum pin (102) is set 11.50 mm (0.4528") above the bottom of the feet (106) and the height of the maximum pin (104) is set 11.75 mm (0.4626") above the bottom of the feet (106).

At condition #1, the reservoir is filled until the water level reaches the minimum pin (102) at a height of 11.50 mm (0.4528"), at which point the first visual indicator (112) (i.e., the "green light") is turned on. At this point (condition #2), the green light is on, but as the water level has not reached the maximum pin (104) at a height of 11.75 mm (0.4626"), the second visual indicator (114) (i.e., the "red light") is off. In this condition #2, it is thus known that the water level is below 11.75 mm (0.4626"). However, it is possible that the water level has dropped to as low as 11.30 mm (0.4449") while still keeping the green light illuminated (due to the 0.20 mm (0.008") surface tension effect), such that in condition #2, it is known that the water level is between 11.30 mm (0.4449") and 11.75 mm (0.4626").

If the water level continues to be increased, eventually it will reach the maximum pin (104) at a height of 11.75 mm (0.4626"), at which point the red light will illuminate in addition to the green light being illuminated. This is shown as condition #3. Now, it is possible that the water level may be decreased below the maximum pin (104) at a height of 11.75 mm (0.4626"), while the red light remains illuminated. Such may occur until the water level has dropped to as low as 11.55 mm (0.4547") while still keeping the red light illuminated (due to the 0.20 mm (0.008") surface tension effect), such that in condition #4 (with both the green and red lights illuminated), it is known that the water level is higher than 11.55 mm (0.4547").

Once the liquid level is dropped below 11.55 mm (0.4547"), the red light goes out, but the green light remains illuminated, as shown in condition #5. Since the green light remains illuminated, it is known that the liquid level remains at or above 11.30 mm (0.4449"). Thus, in condition #5, it is known that the liquid level is between 11.30 mm (0.4449") and 11.55 mm (0.4547"), which is a difference of only 0.25 mm (0.0098").

Ideally, however, the fluid level is lowered slowly until the red light just extinguishes. This will likely guarantee the water level is just below 11.55 mm (0.4547") and above 11.50 mm (0.4528").

If the liquid level was continued to be dropped below 11.30 mm (0.4449"), the green light would extinguish, as shown in condition #6. The level setting process could then be repeated until condition #5 was again achieved, to ensure a known liquid level tolerance range of only 0.25 mm (0.0098").

As should be apparent in view of the above discussion, surface tension on the pins introduces variation to the water height accuracy. To minimize the surface tension effect, optimization of the minimum and maximum pins (102, 104) was found to be highly desired. One contributing factor to an increase in surface tension effect is the surface area of the pin that is in contact with the water. The greater the surface area, the greater the surface tension effect. In addition, the material and finish also affect the surface tension effect. Therefore, various pin shapes, materials and finishes were evaluated.

It was generally found that small diameter pins with a long taper or multiple tapers offered the best results. Standard sewing needles were used as test samples. They were typically steel substrate with nickel plating polished to a smooth surface. This design tends to shed water from the pin as the water level is lowered from the pin. The best designs "release" the surface tension when the pin tip is approximately 0.005" to 0.008" above the water level.

Other pin designs that did not have a long taper tended to "hold" the water and thus increased the surface tension. Some pin designs were found to "release" the surface tension when the pin tip was approximately 0.020 to 0.045" above the water level. Another example would be a piece of copper wire which has a straight outside diameter with a blunt end.

Figure 6A:
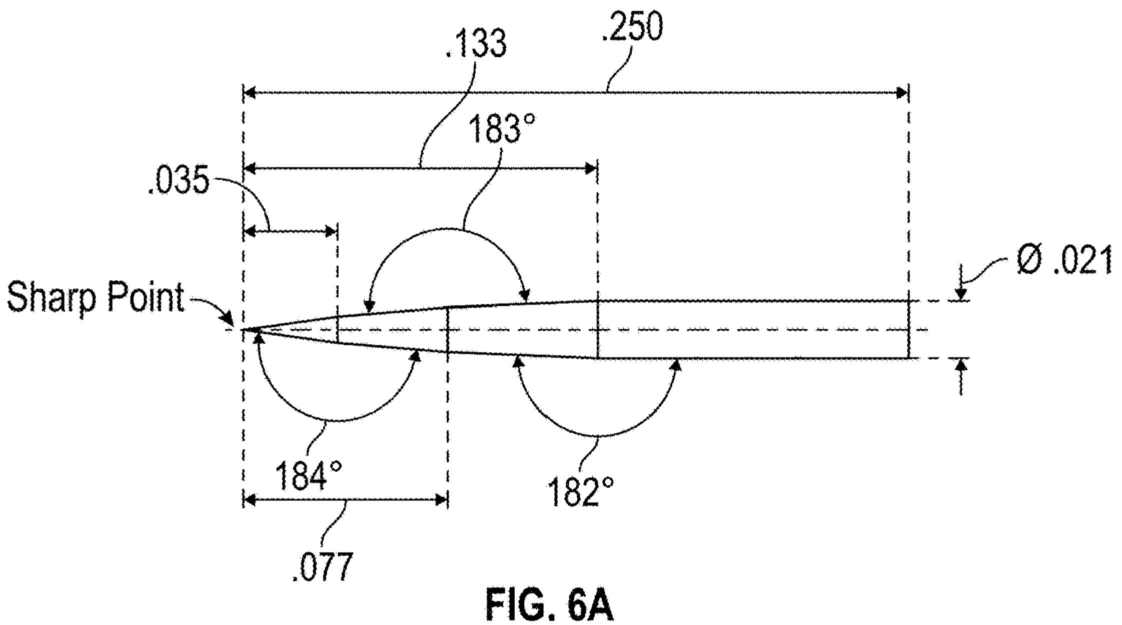
FIGS. 6A-6C are side elevational views of embodiments of pin electrodes that may be employed by the inventive liquid level sensor shown in FIGS. 3 and 4.
Figure 6B:
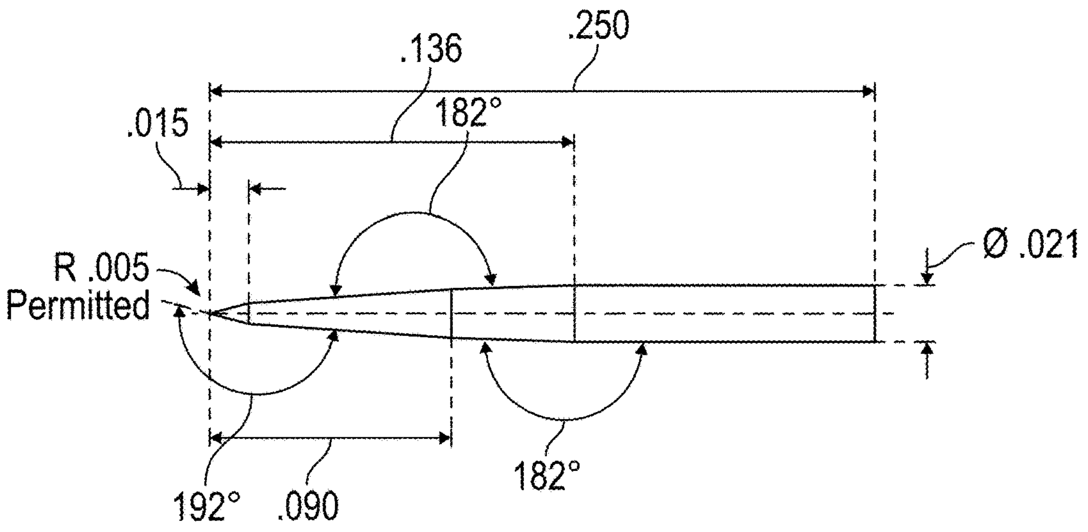
Figure 6C:
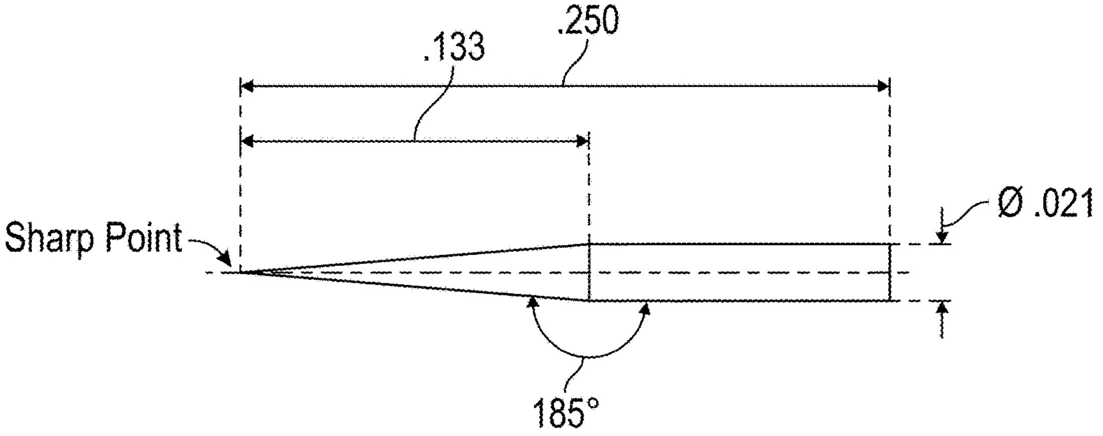

Turning now to FIGS. 6A-6C, exemplary pin configurations in accordance with the present invention are illustrated. The pin material is preferably steel with nickel plate with a smooth surface finish, though other materials may be used such as brass, stainless steel, and titanium. In particularly critical applications, an additional coating may be added to the pin to reduce the surface tension. For example, it has been found that oils, soaps, or other like compounds may help reduce surface tension. The overall length of the pins (0.250" in the illustrated embodiments) of is not critical and can be adjusted based on the application. Dimensions are shown in inches and angles are shown in degrees.

Preferably, the overall diameter of the pins at the point where tapering begins is between 0.010" and 0.035", more preferably between 0.015" and 0.030" and most preferably between 0.020" and 0.025". The overall diameter of the pins at the point where tapering begins in all three of the illustrated embodiments of FIGS. 6A-6C is shown to be 0.021", which has been shown to provide excellent results.

The tapers of the pins with respect to their longitudinal axes has also been found to be an important factor in minimizing surface tension effect. Preferably the taper is between 181° and 193° over a total taper length of between 0.110" and 0.150", thereby creating a relatively long taper adapted to shed water.

A single, continuous taper may be provided, as shown in FIG. 6C, in which case, the taper is preferably between 182° and 188°, more preferably between 183° and 187° and most preferably between 184° and 186°, with 185° having been found to provide excellent results. The total taper length is preferably between 0.110" and 0.150", more preferably between 0.120" and 0.140" and most preferably between 0.125" and 0.135". As shown in FIG. 6C, a total taper length of 0.133" has been found to produce excellent results.

FIG. 6B illustrates a pin configuration having a varying taper, in which a significant majority of the tapered section is provided with a shallower taper, with the end portion being provided with a more pronounced taper. The shallower taper section is preferably angled between 181° and 185°, more preferably between 181° and 184° and most preferably between 181° and 183°, with 182° having been found to provide excellent results. The more pronounced taper section is preferably angled between 187° and 193°, more preferably between 189° and 193° and most preferably between 191° and 193°, with 192° having been found to provide excellent results. The total taper length is preferably between 0.110" and 0.150", more preferably between 0.120" and 0.140" and most preferably between 0.134" and 0.138". As shown in FIG. 6B, a total taper length of 0.136" has been found to produce excellent results. Of the total taper length, a majority thereof is defined by the shallower taper, while only a tip of the pin is provided with the more pronounced taper. More specifically, the length of the more pronounced taper may be between 0.010" and 0.025", preferably between 0.010" and 0.020", with a length of 0.015" (as shown in FIG. 6B) having been found to produce excellent results.

FIG. 6A also illustrates a pin configuration having a varying taper. However, in this embodiment, the pin is provided with a more gently varying taper, essentially having three sections having different taper. In this embodiment, all three sections preferably have tapers angled between 181° and 187°, more preferably between 181° and 186° and most preferably between 181° and 185°. More specifically, a section having a taper of 182° is provided farthest from the tip thereof, which transitions to a section having a taper of 183° in an intermediate portion, and then to a section having a taper of 184° closest to the tip. The total taper length is preferably between 0.110" and 0.150", more preferably between 0.120" and 0.140" and most preferably between 0.130" and 0.135". As shown in FIG. 6A, a total taper length of 0.133" has been found to produce excellent results.

Regardless of the taper angle and length, it has been found that providing a tip having a sharp point provides excellent results. More specifically, the radius of curvature of the tip is preferably less than 0.015", more preferably less than 0.010", and most preferably no more than 0.005".

Figure 7A:
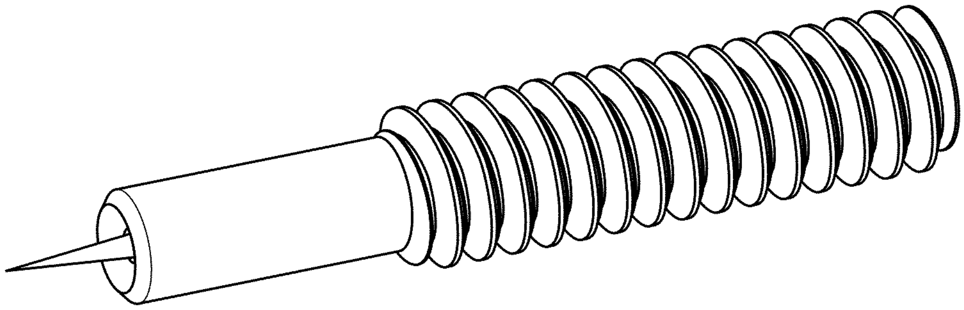
FIGS. 7A and 7B are side isometric and side elevational views of further embodiments of pin electrodes that may be employed by the inventive liquid level sensor shown in FIGS. 3 and 4.
Figure 7B:
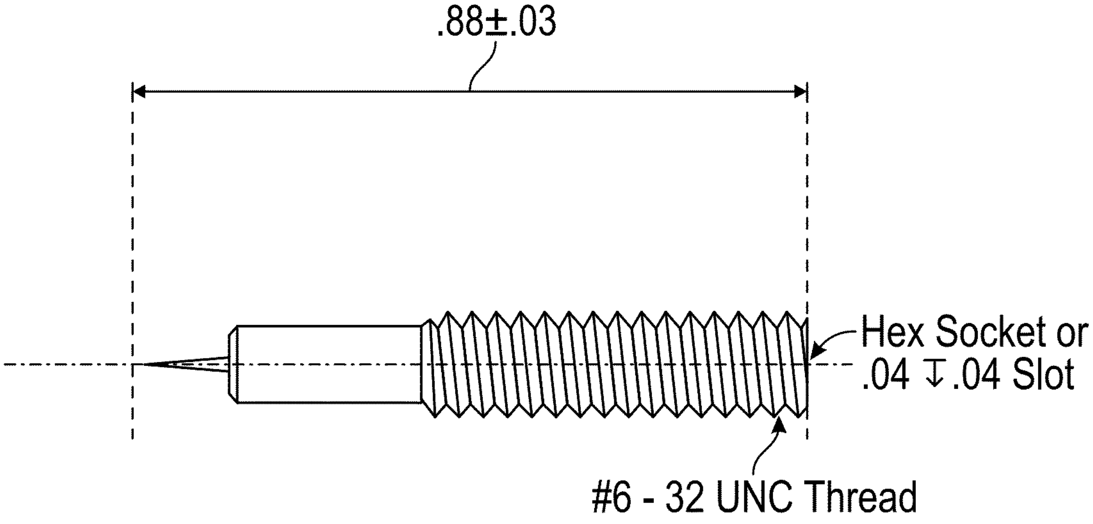

Any of the above-described tip profiles can be created with threads, as shown in FIGS. 7A and 7B, in order to provide for adjustability of the pins with respect to the housing. The pins may be created as a one or multi-piece design. If a multi-piece design, the tip can be attached to the threaded portion by a variety of methods, such as but not limited to adhesive, potting/retaining compound, solder/brazing, press-fit or staking. A hex socket, slot or the like may be provided in the end of the pin opposite to its tip in order to receive a tool to aid in adjustability.

Setting the pins accurately in the liquid level sensor (100) is critical to its performance. One method that performs well uses a functioning liquid level sensor (100) as part of the following process:

1. Fasten the ground pin (110) loosely into the housing (108).

2. Place the printed circuit board (not shown) in place within the housing (108).
3. Slowly adjust the ground pin (110) to 0.20 inches above the housing feet using a gauge block. This height is not critical.
4. Lock the ground pin (110) in place.
5. Fasten the minimum and maximum level pins (102, 104) loosely into the housing (108).
6. Select a precision gauge block(s) that is sized to meet the minimum and maximum water level heights. A machined block may also be used.
7. Place the blocks under each pin (102, 104) of the liquid level sensor (100).
8. Electrically connect the blocks to the ground pin (110) of the liquid level sensor (100).
9. Connect the minimum pin (102) to the green LED (112).
10. Turn the sensor (100) ON.
11. Slowly adjust the minimum pin (102) until the tip contacts the block(s). This will illuminate the green LED (112).
12. Lock the minimum pin (102) in place.
13. Connect the maximum pin (104) to the red LED (114).
14. Ensure the sensor (100) is still ON.
15. Slowly adjust the maximum pin (104) until the tip contacts the block(s). This will illuminate the red LED (114).
16. Lock the maximum pin (104) in place.

The liquid level sensor (100) is now set to the minimum and maximum levels and is ready for use.

In view of the above, it will be recognized that the present invention provides a conductive liquid level sensor of the type that relies on the electrical resistance between one or more sensing electrodes and a common ground/reference electrode in order to determine the level of a liquid, in which the electrodes are particularly configured and particular methods are employed to reduce the potential effects of the surface tension of the liquid being measured on measurement accuracy.

Although the invention has been described with reference to a particular arrangement of parts, features and the like, these are not intended to exhaust all possible arrangements or features, and indeed many other modifications and variations will be ascertainable to those of skill in the art.

For example, the sensor can be made to detect multiple levels using a new PCB schematic, additional probes and ability to switch between desired levels. Other features, modifications and enhancements are also contemplated.

What is claimed is:

1. An electronic liquid level sensor configured to verify a height of a liquid in a reservoir between minimum and maximum levels, said sensor comprising:

a housing having a bottom wall;

at least one reference electrode extending downward from the bottom wall of said housing to a reference level height;

a minimum level electrode extending downward from the bottom wall of said housing to a minimum level height;

a maximum level electrode extending downward from the bottom wall of said housing to a maximum level height;

wherein the minimum level height is vertically lower than the maximum level height, and wherein the reference level height is vertically lower than both the minimum level height and the maximum level height;

a first indicator responsive to a circuit being closed between said minimum level electrode and said at least one reference electrode such that when the liquid level reaches the minimum level height the first indicator is activated;

a second indicator responsive to a circuit being closed between said maximum level electrode and said at least one reference electrode such that when the liquid level reaches the maximum level height the second indicator is activated; and wherein each of said minimum level electrode and said maximum level electrode is configured as a pin having at least one tapered portion with a diameter between 0.010" and 0.035" at a widest point of the tapered portion, wherein an angle of taper of the at least one tapered portion with respect to a longitudinal axis of the pin is between 181° and 193°, wherein a total length of the at least one tapered portion is between 0.110" and 0.150", and wherein a radius of curvature of a tip of the pin is less than 0.015".

2. The electronic liquid level sensor of claim 1 wherein the diameter of the at least one tapered portion at the widest point thereof is between 0.015" and 0.030".

3. The electronic liquid level sensor of claim 2 wherein the diameter of the at least one tapered portion at the widest point thereof is between 0.020" and 0.025".

4. The electronic liquid level sensor of claim 1 wherein the angle of taper of the at least one tapered portion with respect to the longitudinal axis of the pin is between 182° and 188°.

5. The electronic liquid level sensor of claim 4 wherein the angle of taper of the at least one tapered portion with respect to the longitudinal axis of the pin is between 183° and 187°.

6. The electronic liquid level sensor of claim 5 wherein the angle of taper of the at least one tapered portion with respect to the longitudinal axis of the pin is between 184° and 186°.

7. The electronic liquid level sensor of claim 1 wherein the total length of the at least one tapered portion is between 0.120" and 0.140".

8. The electronic liquid level sensor of claim 7 wherein the total length of the at least one tapered portion is between 0.125" and 0.135".

9. The electronic liquid level sensor of claim 1 wherein the radius of curvature of the tip of the pin is less than 0.010".

10. The electronic liquid level sensor of claim 9 wherein the radius of curvature of the tip of the pin is no more than 0.005".

11. The electronic liquid level sensor of claim 1 wherein the at least one tapered portion comprises a single taper portion having a single taper angle.

12. The electronic liquid level sensor of claim 1 wherein the at least one tapered portion comprises multiple tapered portions, each having a different taper angle.

13. The electronic liquid level sensor of claim 1 wherein the liquid is deionized water.

14. The electronic liquid level sensor of claim 13 wherein each of said minimum level electrode and said maximum level electrode is configured so as to cause the deionized water to exhibit a surface tension effect of 0.008" or less, whereby a known liquid level tolerance range of one thousandth of an inch or less is achieved.

15. The electronic liquid level sensor of claim 1 wherein the at least one reference electrode comprises a single common reference electrode.

16. The electronic liquid level sensor of claim 1 wherein each of the pins comprises a steel substrate with a polished nickel plating.

17. The electronic liquid level sensor of claim 1 wherein each of said minimum level electrode and said maximum level electrode is configured so as to allow for the minimum level height and the maximum level height to be adjustable.

18. The electronic liquid level sensor of claim 17 wherein the adjustability of the minimum level height and the maximum level height is accomplished by provision of said minimum level electrode and said maximum level electrode with threaded portions.

19. The electronic liquid level sensor of claim 1 further comprising at least one foot extending from the bottom wall of said housing to at least the same extent as does the at least one reference electrode.

20. The electronic liquid level sensor of claim 1 wherein said first indicator and said second indicator comprise visual indicators.

21. The electronic liquid level sensor of claim 20 wherein said first indicator and said second indicator comprise lights.

22. The electronic liquid level sensor of claim 21 wherein said first indicator comprises a green light and wherein said second indicator comprises a red light.

23. A system for ultrasonic sample preparation comprising:

a liquid reservoir defined in part by an ultrasonic horn having a top surface; and the electronic liquid level sensor of claim 1 disposed on the top surface of the ultrasonic horn.

24. An electronic sensor configured to verify a height of deionized water in a reservoir between minimum and maximum levels, said sensor comprising:

a housing having a bottom wall;

a common reference electrode extending downward from the bottom wall of said housing to a reference level height;

a minimum level electrode extending downward from the bottom wall of said housing to a minimum level height;

a maximum level electrode extending downward from the bottom wall of said housing to a maximum level height;

wherein the minimum level height is vertically lower than the maximum level height, and wherein the reference level height is vertically lower than both the minimum level height and the maximum level height;

wherein each of said minimum level electrode and said maximum level electrode is comprises a threaded portion configured so as to allow for the minimum level height and the maximum level height to be adjustable;

at least one foot extending from the bottom wall of said housing to at least the same extent as does the common reference electrode;

a first light responsive to a circuit being closed between said minimum level electrode and said at least one reference electrode such that when the water level reaches the minimum level height the first light is illuminated;

a second light responsive to a circuit being closed between said maximum level electrode and said at least one reference electrode such that when the water level reaches the maximum level height the second light is illuminated;

wherein each of said minimum level electrode and said maximum level electrode is configured as a steel pin with a polished nickel plating and having at least one tapered portion with a diameter between 0.010" and 0.035" at a widest point of the tapered portion, wherein an angle of taper of the at least one tapered portion with respect to a longitudinal axis of the pin is between 181° and 193°, wherein a total length of the at least one tapered portion is between 0.110" and 0.150", and wherein a radius of curvature of a tip of the pin is less than 0.015"; and wherein each of said minimum level electrode and said maximum level electrode is configured so as to cause the water to exhibit a surface tension effect of 0.008" or less, whereby a known liquid level tolerance range of one thousandth of an inch or less is achieved.

* * * * *